UNITED STATES PATENT OFFICE.

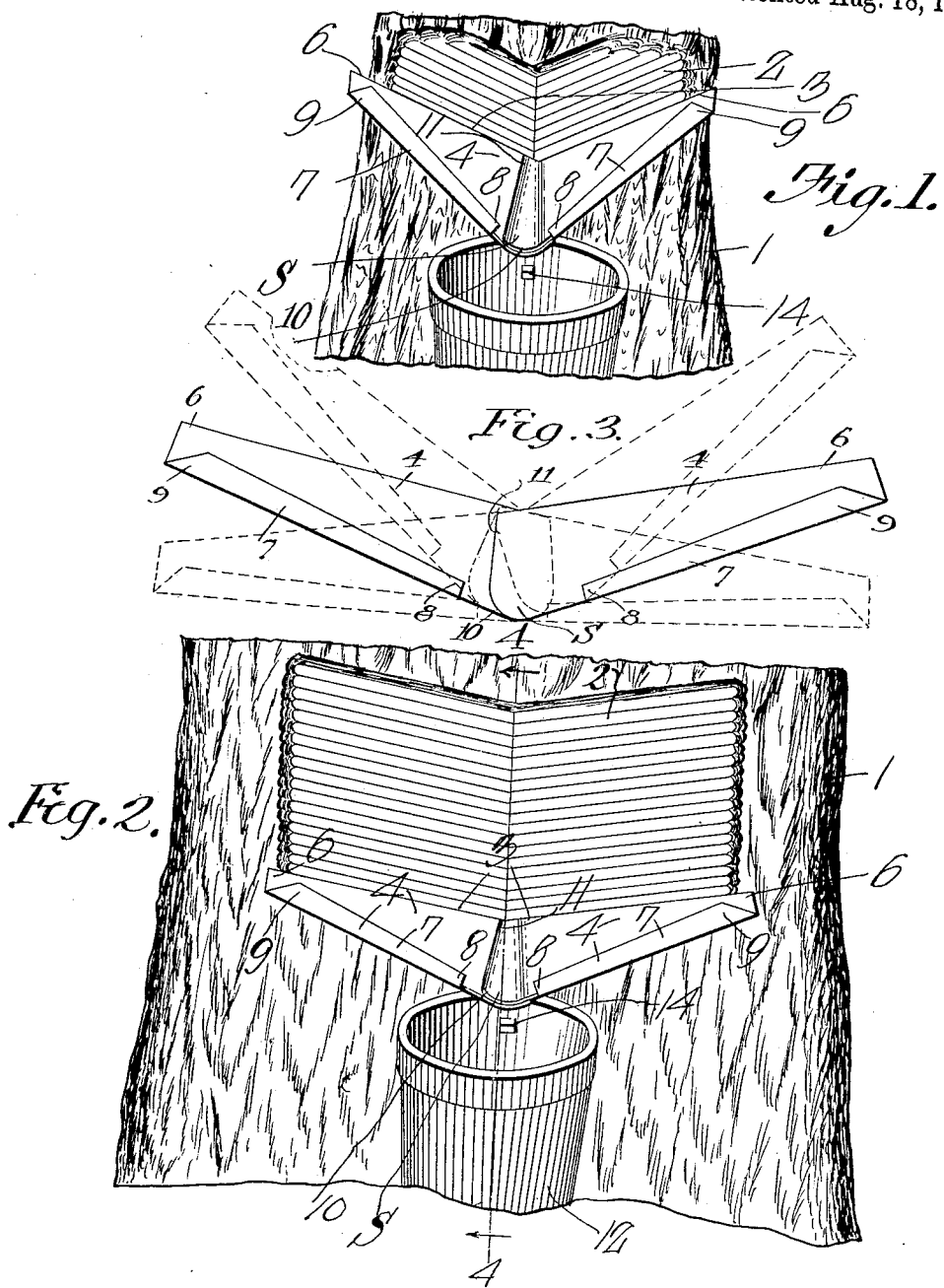

CHARLES L. KRAGER, OF DAISY, TENNESSEE, ASSIGNOR TO HERTY TURPENTINE CO., OF JACKSONVILLE, FLORIDA, A CORPORATION OF FLORIDA.

SAP-DIRECTING SPOUT.

1,107,969.    Specification of Letters Patent.    Patented Aug. 18, 1914.

Application filed September 1, 1911. Serial No. 647,269.

*To all whom it may concern:*

Be it known that I, CHARLES L. KRAGER, a citizen of the United States, residing at Daisy, in the county of Hamilton and State of Tennessee, have invented a new and useful Sap-Directing Spout, of which the following is a specification.

The present invention relates to improvements in sap directing spouts, the particular spout being adapted for use in the obtaining of turpentine, although it is obvious that it may be used for obtaining maple syrup and rubber gum; and the primary object of the invention is the provision of an adjustable sectional apron and spout, whereby any diameter of tree may be operated upon.

To carry this invention into practice, a combined apron and spout made in two sections, each of which is provided with a tree engaging rear edge, to be inserted in the usual angular incision in the trunk of the tree is provided, each of said sections, being further provided with a lip or flange upon its forward edge and with a broad and rounded inner terminal. When assembled, these terminals of the two sections overlap to produce a central spout, to which the lips or flanges converge to deliver the sap or turpentine, said terminals not being connected otherwise together, but providing a means whereby various diametered trees may be operated upon with a single size of adjustable apron and spout, the angle of the sections with relation to each other being changed with the overlapping spout forming terminals, as the central or pivot point.

A further object of the present invention is the provision of a rim upon the forward edge of each of the respective tree engaging and sap directing members that constitutes a means for directing the sap toward the outlet end of the members, and also constitutes a handle or gripping means whereby the member may be properly manipulated when inserted within the cut of the tree or withdrawn therefrom.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a front elevation of the apparatus as applied to a small diametered tree. Fig. 2 is a similar view as applied to a larger diametered tree, illustrating the applicability of the apron and spout to both sizes of tree trunk. Fig. 3 is a detail view of the apron and spout in elevation, dotted lines illustrating the various possible adjustments thereof.

Referring to the drawings, the numeral 1 designates the tree trunk, which to put the present invention into practice is cut as indicated at 2, with the obtuse V-shaped bark shaving, and further with the two upwardly inclined V-shaped incisions 3.

Adapted to be driven or otherwise pushed within the respective incisions 3, is a section 4, of the adjustable combined turpentine conveying apron and spout S, each section of which is provided with the rear edge 6, for insertion in the said incision 3, the forward edge thereof, being provided with the upturned lip or flange 7, which tapers from its inner end 8, to its upper and outer end 9, where the same is rounded and slightly bent inwardly toward the body of the main body of the section. By this means the main body of the sections as viewed in Fig. 3 is smaller at its outer end than at its other end, which other end as shown is made curved or rounded at 10, and inclining rearwardly as at 11, toward the rear edge of the section, the same providing a portion of the central spout S, of the device, which when the sections are assembled as shown in Figs. 1, 2 and 3, overlap and by reason of the fact that said sections may be turned, with the overlapped portion as a sort of pivot, the lips or flanges will at all times provide a guiding wall upon opposite sides of the spout S, so that the sap flowing from the incision 3, will flow upon the main body of each section, and be guided by the said lips or flanges to the spout S, into the sap cut 12. It will thus be seen that the respective sections 4 in plan, each simulates a truncated triangle, the base of which is provided with a curved angle and with an obtuse angle, the curved angle being at the front edge while the obtuse angle is at the rear edge. By reason of this peculiar shaping of the base, the respective overlapping portions of the two co-acting members when in the position, as shown in Fig. 3, will not separate so as to provide a space between the adjacent ends that would tend to permit the sap to fall downwardly or leak upon the adjacent face of the tree nor do any portions of the plate project beyond the outer face of the adjacent member, thus providing a spout of the highest efficiency for directing the sap into the cup and permitting the use of the two sections upon various diametered trees without in any way destroying the directing effect of the spout.

In putting the invention into use, as above described and as shown the sections are inserted into the incisions 3 of the tree, the adjustment of separable sections permitting them to be used upon various diametered trees, and directly below the spout S, in a convenient distance therefrom, is driven a hard wood peg 13, which is provided with the squared body portion and head 14, over which removably fits, the square aperture 15, of the earthen sap cup 12.

By providing the rearwardly inclined edge 11, the spout may be turned to assume the various full and dotted line positions in Fig. 3, and not produce any objectionable recess or outlet otherwise than the outlet between the shoulders 8 of the sections 4, the two ends of the respective sections being overlapped to permit of the rotation of the sections relative to each other to assume the positions and thus accommodate the sections to various diametered trees, and not render it necessary to form sections in varying lengths and widths as is the usual practice. The most important feature of the invention, however, resides in the adjustable sectional combined apron and spout, which being made in only one size, can be made to fit any diameter of tree, and properly convey the turpentine to the sap cup.

In assembling the present spout, the proper incisions for the reception of the edge 6 of the two sections 4 are made, so that when the rear edge is inserted therein, the concaved portions of each member are loosely overlapped to form a spout and as the forward edge of such portion of the sections is curved, the spout is readily adapted for use in connection with various diametered trees as the members may be spread fan-like relatively to each other, the lip or flange 7 being used to assist in placing the member in the incision and in adjusting the members so that the concaved portions overlap.

What is claimed, is:—

A sap collecting apron or spout, composed of two similar shaped metallic members, the main body of each of which is substantially a truncated triangular plate, the rear edge of which is the tree engaging edge, the short edge of each plate being curved at one corner and concaved transversely while the other corner is formed at an obtuse angle to the rear edge, there being provided a rim upon the forward edge extending from a point near the apex to a point adjacent the curved edge, said plates when assembled having their concaved portions loosely overlapped to form a sap directing spout between the ends of the rims, and to permit the plates to be spread fan-like to accommodate various diametered trees, and each rim also constituting a gripping means whereby the member may be forcibly inserted in or withdrawn from a cut in a tree.

In testimony that I claim the foregoing as my own, I have hereto affixed my signature in the presence of two witnesses.

CHARLES L. KRAGER.

Witnesses:
FRANK B. OCHSENREITER,
I. E. SIMPSON.

---

Copies of this patent may be obtained for five cents each, by addressing the "Commissioner of Patents, Washington, D. C."